United States Patent
Goss et al.

(10) Patent No.: US 10,162,436 B2
(45) Date of Patent: Dec. 25, 2018

(54) OPERATING DEVICE FOR A DOMESTIC APPLIANCE HAVING A ROTARY RING AND HAVING A LIGHT STRIP

(71) Applicant: BSH Hausgeräte GmbH, Munich (DE)

(72) Inventors: Ulrich Goss, München (DE); Christoph Ortmann, München (DE); Robert Sachon, München (DE)

(73) Assignee: BSH Hausgeräte GmbH, Munich (DE)

( * ) Notice: Subject to any disclaimer, the term of this patent is extended or adjusted under 35 U.S.C. 154(b) by 7 days.

(21) Appl. No.: 15/503,014

(22) PCT Filed: Aug. 12, 2015

(86) PCT No.: PCT/EP2015/068568
§ 371 (c)(1),
(2) Date: Feb. 10, 2017

(87) PCT Pub. No.: WO2016/026751
PCT Pub. Date: Feb. 25, 2016

(65) Prior Publication Data
US 2017/0235383 A1    Aug. 17, 2017

(30) Foreign Application Priority Data
Aug. 19, 2014 (DE) .................. 10 2014 216 398

(51) Int. Cl.
*G06F 3/0362* (2013.01)
*F24C 7/08* (2006.01)
(Continued)

(52) U.S. Cl.
CPC ............ *G06F 3/0362* (2013.01); *F24C 7/082* (2013.01); *G05G 1/015* (2013.01); *G05G 1/105* (2013.01); *F21V 33/0044* (2013.01)

(58) Field of Classification Search
CPC .......... G06F 3/0362; F24C 7/08; F24C 7/082; G05G 1/015; G05G 1/105; G05G 1/08; F21V 33/0044
See application file for complete search history.

(56) References Cited

U.S. PATENT DOCUMENTS

2006/0092129 A1 * 5/2006 Choquet ................ G05G 1/105
345/156
2006/0207867 A1   9/2006 Waddington
(Continued)

FOREIGN PATENT DOCUMENTS

DE   102010039559 A1   2/2012
DE   102012220255 A1   5/2014
(Continued)

OTHER PUBLICATIONS

International Search Report PCT/EP2015/068568 dated Nov. 3, 2015.
National Search Report DE 10 2014 216 398.6 dated Jun. 18, 2015.

*Primary Examiner* — Tom V Sheng
(74) *Attorney, Agent, or Firm* — Michael E. Tschupp; Andre Pallapies; Brandon G. Braun

(57) ABSTRACT

An operating device for a domestic appliance includes an operating element having a rotary ring to set operating conditions of the domestic appliance according to a rotary movement, and an electronic display area enclosed by the rotary ring. An optical light strip in a form of a circumferential ring is arranged adjacent to and separate from the rotary ring to indicate visually a length of a rotary path travelled by the rotary ring in a rotary movement.

16 Claims, 2 Drawing Sheets

(51) Int. Cl.
  *G05G 1/015* (2008.04)
  *G05G 1/10* (2006.01)
  *F21V 33/00* (2006.01)

(56) References Cited

U.S. PATENT DOCUMENTS

2008/0062673 A1     3/2008   Hwang et al.
2010/0319479 A1*   12/2010   Sjolin .................... G05G 1/015
                                                                             74/504
2011/0148775 A1     6/2011   Rudolph et al.
2013/0099009 A1*   4/2013   Filson ................ G05D 23/1902
                                                                           236/1 C
2014/0139637 A1*   5/2014   Mistry ................. H04N 5/2252
                                                                           348/46
2017/0242573 A1*   8/2017   Goss ................... G06F 3/04847

FOREIGN PATENT DOCUMENTS

| EP | 2535785 A1 | 12/2012 |
| EP | 2597377 A1 | 5/2013 |
| WO | 2012080156 A1 | 6/2012 |

* cited by examiner

OPERATING DEVICE FOR A DOMESTIC APPLIANCE HAVING A ROTARY RING AND HAVING A LIGHT STRIP

CROSS-REFERENCES TO RELATED APPLICATIONS

This application is the U.S. National Stage of International Application No. PCT/EP2015/068568, filed Aug. 12, 2015, which designated the United States and has been published as International Publication No. WO 2016/026751 A1 and which claims the priority of German Patent Application, Serial No. 10 2014 216 398.6, filed Aug. 19, 2014, pursuant to 35 U.S.C. 119(a)-(d).

BACKGROUND OF THE INVENTION

The invention relates to an operating device for a domestic appliance, which operating device has an operating element comprising a rotary ring. The rotary ring can be used to set operating conditions of the domestic appliance according to a rotary movement. The operating element comprises an electronic display area, which is enclosed by the rotary ring. The invention also covers a domestic appliance having an operating device of this type.

WO 2012/080 156 A1 discloses an operating device of this type and a domestic appliance of this type.

The object of the present invention is to create an operating device and a domestic appliance for which the angular position of the rotary ring can be discerned more easily by a user.

BRIEF SUMMARY OF THE INVENTION

This object is achieved by an operating device for a domestic appliance and by a domestic appliance as claimed in the independent claims.

An operating device according to the invention for a domestic appliance comprises an operating element having a rotary ring. This rotary ring can thus rotate relative to other components of the operating device, with the result that in this respect it is also manually operated and moved correspondingly as regards a setting. The rotary ring can be used to set operating conditions of the domestic appliance according to a rotary movement and/or an angular position. The operating element also additionally comprises an electronic display area, which is enclosed by the rotary ring. Hence additional information can also be displayed on the operating element itself, with the arrangement of the display area and the rotary ring also achieving an extremely compact design in this case. Furthermore, by virtue of the display area in particular being fixed in position, and hence the rotary ring being able to move relative to this display area, which constitutes a further component of the operating element, the display area does not move at the same time when the rotary ring is operated, and thus the information displayed thereon is then also not rotated in an undesirable manner.

An essential idea of the invention can be considered that an optical light strip in the form of a circumferential ring is formed adjacent to the rotary ring and separate from the rotary ring, which light strip is used to indicate visually the length of a rotary path travelled by the rotary ring in a rotary movement. By virtue of this embodiment, the angular position of the rotary ring relative to the display area and/or to other components of the operating device is effectively displayed to a user in a manner that is visible and easily comprehensible at all times. The separation between the rotary ring and the light strip means that it is also possible to create technically simple designs for the arrangement of the light sources of the light strip and for the signal connection and power supply. It is thus also provided that the light strip is fixed in position and that, separate therefrom, the rotary ring can then rotate relative to the light strip. The additional fact that this light strip is separate from the rotary ring yet is immediately adjacent thereto and thus is arranged in close proximity and directly adjacent thereto, means that the association can be discerned by a user extremely advantageously, and with regard to visual perception, the light strip, which is then likewise in the shape of a ring, also gives the impression that this light strip is also part of the rotary ring. Far better perception of the angular position of the rotary ring is thus achieved, and tracking of the associated selectable operating condition can be improved and/or it can be seen how far a rotary ring may still need to be rotated in order to set or select a desired operating condition.

It is advantageously provided that the light strip is formed adjacent to an outer edge of the rotary ring that faces away from the display area. This embodiment allows the light strip also to have a wider design viewed in the radial direction, because this then does not entail reducing in size the display area enclosed by the rotary ring.

In another advantageous, alternative embodiment, the light strip is formed adjacent to an inner edge of the rotary ring that faces the display area. The advantage with this embodiment is that usually when the rotary ring is touched and gripped on its outside or on the surface by the fingers of a user, the fingers then do not cover at least portions of the light strip, allowing an unrestricted view of the display of the light strip, which is uncovered at all times.

It can also be provided in another embodiment that the light strip is designed in two parts, and is formed both adjacent to an outer edge of the rotary ring that faces away from the display area and also adjacent to an inner edge of the rotary ring that faces the display area. In such an embodiment, the rotary ring is thus provided on both ring edges with an adjacent light strip, with the result that it is effectively framed on both sides by light strips.

It is preferably provided that the light strip indicates the rotary path travelled by the rotary ring as a continuous line.

It can also be provided that the light strip indicates the rotary path travelled as a line composed of discontinuous individual segments, which line then effectively appears also as a dashed line.

It is preferably provided that a number of optically illuminable light segments of the light strip equals sixty elements per complete revolution. By virtue of such a specific number and a corresponding segmentation, the light strip can assume an additional function, for instance can also represent a minutes indicator. If, in this context, the rotary ring is used to enter a parameter, for example the time length of an operating program to be performed by the domestic appliance, this specific number then also effectively displays a minutes indicator, because, for instance, an hour equals 60 minutes and hence by means of this specific number for the segmentation, the rotation can then also be indicated visually precisely in terms of minutes.

It is preferably provided that the display area of the operating element has a touch-sensitive design.

In addition, the invention relates to a domestic appliance having at least one operating device according to the invention or having an advantageous embodiment thereof.

In particular, the invention achieves that a light line is positioned graphically directly against the rotary ring but separate therefrom, and also encircles said rotary ring immediately adjacent thereto. The light line, or the light strip, in terms of the illumination runs synchronously with the rotary movement of the rotary ring.

Further features of the invention are given in the claims, the figures and the description of the figures. The features and combinations of features mentioned above in the description, and the features and combinations of features mentioned below and/or shown solely in the figures can be used not just in the particular combination given but also in other combinations or in isolation without departing from the scope of the present invention. Thus embodiments of the invention that are not shown explicitly in the figures nor explicitly described, but follow, and can be obtained, from the described embodiments by separate combinations of features, are also deemed covered and disclosed by the invention.

BRIEF DESCRIPTION OF THE DRAWINGS

Exemplary embodiments of the invention are explained in greater detail below with reference to schematic drawings, in which.

DETAILED DESCRIPTION OF EXEMPLARY EMBODIMENTS OF THE PRESENT INVENTION

In the figures, elements that are identical or have the same function are denoted by the same reference signs.

Figure 1:
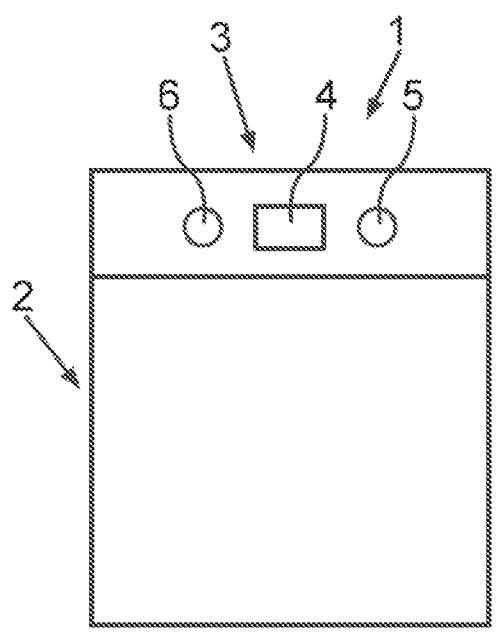
FIG. 1 is a perspective view of an exemplary embodiment of a domestic appliance according to the invention.

FIG. 1 shows a domestic appliance 1, for example for laundry care or for food preparation or for dishwashing or for storing and preserving food. The domestic appliance 1 is thus, for example, a washing machine or a tumble dryer or a washer-dryer. In this context, however, it may also be an oven or a microwave oven or a steam cooker. Likewise, it may be a hob, for example. In addition, the domestic appliance 1 may also be a dishwasher or a refrigerator or a freezer or a combined fridge-freezer.

The domestic appliance 1 comprises a housing 2 and an operating device 3. The operating device 3 comprises, for example, at least one display unit 4 and at least one operating element 5, with an additional operating element 6 being shown here. It should be pointed out that the positional arrangement of the operating device 3 and thus in particular also of the display unit 4 and of the operating elements 5 and 6, as well as the quantity thereof, shall be understood to be merely by way of example.

Figure 2:
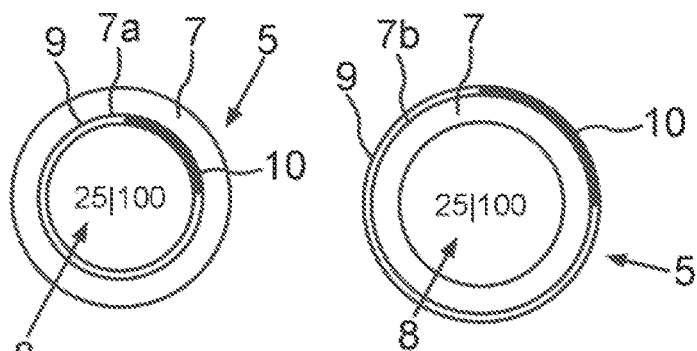
FIG. 2 are diagrams of examples of positions of a light strip of an operating element having a continuous light line.

The operating element 5 is designed such that, as shown in the diagram in FIG. 2, it comprises a rotary ring 7, which can rotate about an axis that is perpendicular to the plane of the figure. The rotary ring 7 can preferably rotate both clockwise and counterclockwise. The operating element 5 also comprises an electronic display area 8, which is encircled by the rotary ring 7. The display area 8 is fixed in position and thus cannot rotate. The rotary ring 7 can thus be moved relative to the display area 8 and independently thereof. An operating condition of the domestic appliance 1 can be selected or set by a rotary movement of the rotary ring 7.

In the exemplary embodiment shown in FIG. 2 in the left-hand illustration, the operating element 5 also comprises an optical light strip 9 in the form of a circumferential ring. It is formed and arranged separate from the rotary ring 7, and in particular is also fixed in position, and thus, in a preferred embodiment, the rotary ring 7 can be rotated relative to the fixed optical light strip 9. As the figure also shows, the light strip 9 is immediately and thus directly adjacent to an inner edge 7a of the rotary ring 7 that faces the display area 8. The light strip 9 preferably comprises a plurality of separate light sources, for instance light emitting diodes. Specific light sources light up according to the rotary movement of the rotary ring 7, with the result that, beginning from a starting point of the rotary movement, the rotary distance or rotary path travelled by the rotary ring 7 is then visually indicated by the lighting-up of those light sources that then indicate visually the length of this rotary path. In this case, the left-hand illustration of FIG. 2 shows by way of example the lighting-up of the light sources, which then display a light line 10 as a quarter-circle, as an example. Thus in this embodiment, the rotary ring 7 is rotated clockwise from its 12 o'clock position to the 3 o'clock position, and this is visually indicated by the corresponding light line 10.

The right-hand illustration in FIG. 2 shows as an alternative embodiment that the light strip 9 is arranged directly adjacent to an outer edge 7b of the rotary ring 7.

A combination of the embodiments in FIG. 2 can also be provided, according to which there is both a light strip 9 formed adjacent to the inner edge 7a and also a light strip 9 arranged adjacent to the outer edge 7b.

A value or a value ratio, which is information that depends on the lighting-up of the light sources, for example can then also be displayed on the display area 8. In the exemplary embodiment in FIG. 2, the value of a quarter can be displayed, for example, which thus states the path length of the light line 10 as a ratio with respect to a path length of a complete revolution. This value display can also be stated in terms of the base parameter, specifically the number of base divisions, with 100 value units being assigned to a complete revolution in FIG. 2 by way of example, and thus 25 value units are indicated visually in the exemplary embodiment in FIG. 2.

In addition, FIG. 2 shows the embodiment in which the visual indicator is represented as a continuous line, in other words as light line 10.

Figure 3:
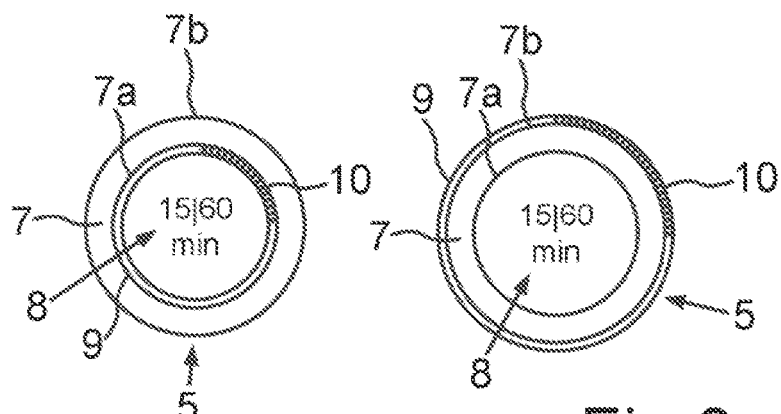
FIG. 3 is a corresponding diagram to FIG. 2 but having a segmented light line and thus a dashed light line.

FIG. 3 shows examples of designs for arrangements and visual indicators that correspond to FIG. 2 but in which the light line 10 is represented not as a continuous line but is composed of individual segments, thereby effectively showing a dashed light line. Here, as an alternative example, in the display area 8 is shown the set time period that is then indicated by the optical light line 10 and that states a proportion of the complete revolution, where time units are shown in this case and thus 60 minutes can be displayed for a complete revolution, and hence in the examples shown in FIG. 3, 15 minutes were indicated or selected by the quarter-circle.

It can also be provided that the display area 8 has a touch-sensitive design and thus this facilitates also corresponding setting options and display changes.

Figure 4:
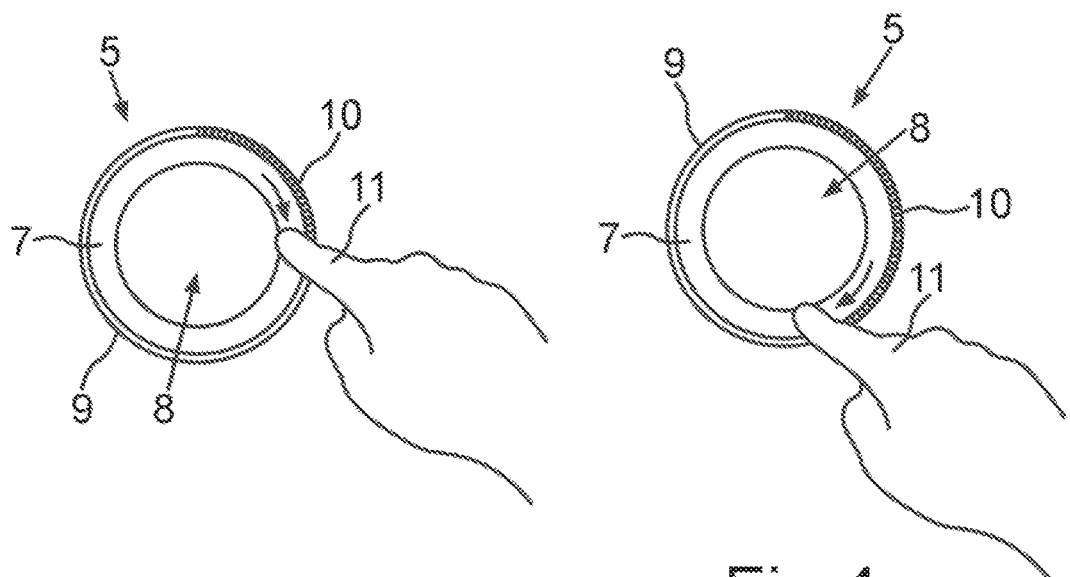
FIG. 4 is a diagram showing by way of example the operation of a rotary ring of the operating element, and illumination of a light line of a light strip that automatically tracks the position precisely.

FIG. 4 shows in example illustrations that visual indication on the light strip 9 is performed automatically and simultaneously with the execution of a rotary movement of the rotary ring 7, for example by touching with a finger 11, and the then corresponding light line 10 is automatically displayed immediately over the corresponding length, and the relevant light sources light up accordingly.

LIST OF REFERENCE CHARACTERS

1 domestic appliance
2 housing
3 operating device
4 display unit
5 operating element
6 operating element
7 rotary ring
7*a* inner edge
7*b* outer edge
8 display area
9 optical light strip
10 light line
11 finger

The invention claimed is:

1. An operating device for a domestic appliance, comprising:
   an operating element including a rotary ring configured to set operating conditions of the domestic appliance according to a rotary movement, and an electronic display area enclosed by the rotary ring; and
   an optical light strip in a form of a circumferential ring arranged adjacent to and separate from the rotary ring to indicate visually both a length of a rotary path travelled by the rotary ring in a rotary movement and an amount of time.

2. The operating device of claim 1, wherein the rotary ring has an outer edge which faces away from the electronic display area, said light strip being arranged adjacent to the outer edge of the rotary ring.

3. The operating device of claim 1, wherein the rotary ring has an inner edge which faces the electronic display area, said light strip being arranged adjacent to the inner edge of the rotary ring.

4. The operating device of claim 1, wherein the light strip indicates the rotary path travelled as a continuous line.

5. The operating device of claim 1, wherein the light strip indicates the rotary path travelled as a light line composed of discontinuous individual segments.

6. The operating device of claim 1, wherein the light strip indicates and illuminates the length of the rotary path travelled as a light line which is produced synchronously with the rotary movement.

7. The operating device of claim 1, wherein the light strip has a number of optically illuminable light segments, which number equals sixty per revolution.

8. The operating device of claim 1, wherein the electronic display area has a touch-sensitive design.

9. A domestic appliance, comprising an operating device, said operating device comprising an operating element including a rotary ring configured to set operating conditions of the domestic appliance according to a rotary movement, and an electronic display area enclosed by the rotary ring, and an optical light strip in a form of a circumferential ring arranged adjacent to and separate from the rotary ring to indicate visually both a length of a rotary path travelled by the rotary ring in a rotary movement and an amount of time.

10. The domestic appliance of claim 9, wherein the rotary ring has an outer edge which faces away from the electronic display area, said light strip being arranged adjacent to the outer edge of the rotary ring.

11. The domestic appliance of claim 9, wherein the rotary ring has an inner edge which faces the electronic display area, said light strip being arranged adjacent to the inner edge of the rotary ring.

12. The domestic appliance of claim 9, wherein the light strip indicates the rotary path travelled as a continuous line.

13. The domestic appliance of claim 9, wherein the light strip indicates the rotary path travelled as a light line composed of discontinuous individual segments.

14. The domestic appliance of claim 13, wherein the light strip indicates and illuminates the length of the rotary path travelled as a light line which is produced synchronously with the rotary movement.

15. The domestic appliance of claim 9, wherein the light strip has a number of optically illuminable light segments, which number equals sixty per revolution.

16. The domestic appliance of claim 9, wherein the electronic display area has a touch-sensitive design.

* * * * *